(12) United States Patent
Brown et al.

(10) Patent No.: US 7,046,254 B2
(45) Date of Patent: May 16, 2006

(54) DISPLAYING TRANSPARENT RESOURCE AIDS

(75) Inventors: Michael Wayne Brown, Georgetown, TX (US); Andrew Douglas Hately, Austin, TX (US); Kelvin Roderick Lawrence, Round Rock, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 10/059,011

(22) Filed: Jan. 28, 2002

(65) Prior Publication Data

US 2003/0142109 A1 Jul. 31, 2003

(51) Int. Cl.
*G09G 5/02* (2006.01)

(52) U.S. Cl. ............... 345/592; 715/705; 715/708; 715/710; 715/711; 715/715

(58) Field of Classification Search ............... 345/592, 345/705–715, 768, 186–188 FOR, 188 REF, 345/961 C, 961 REF
See application file for complete search history.

(56) References Cited

U.S. PATENT DOCUMENTS

| | | | |
|---|---|---|---|
| 5,377,317 A | 12/1994 | Bates et al. | 715/789 |
| 5,390,295 A | 2/1995 | Bates et al. | 715/789 |
| 5,463,775 A | 10/1995 | DeWitt et al. | |
| 5,572,672 A | 11/1996 | Dewitt et al. | 395/184.01 |
| 5,600,779 A | 2/1997 | Palmer et al. | 395/340 |
| 5,651,107 A | 7/1997 | Frank et al. | 395/344 |
| 5,764,229 A | 6/1998 | Bennett | 345/345 |
| 5,805,163 A * | 9/1998 | Bagnas | 345/345 |
| 5,825,355 A | 10/1998 | Palmer et al. | 345/336 |
| 5,838,317 A | 11/1998 | Bolnick et al. | 345/339 |
| 5,852,440 A * | 12/1998 | Grossman et al. | 715/811 |
| 5,859,639 A | 1/1999 | Ebrahim | 345/345 |
| 5,889,530 A | 3/1999 | Findlay | 345/440 |
| 5,917,492 A | 6/1999 | Bereiter et al. | 345/357 |
| 6,002,397 A | 12/1999 | Jaaskelainen et al. | 345/340 |
| 6,002,400 A | 12/1999 | Loring et al. | 345/348 |
| 6,005,570 A | 12/1999 | Gayraud et al. | 345/338 |
| 6,049,798 A | 4/2000 | Bishop et al. | 707/10 |
| 6,342,908 B1 * | 1/2002 | Bates et al. | 715/798 |
| 6,353,450 B1 * | 3/2002 | DeLeeuw | 345/768 |
| 6,563,514 B1 * | 5/2003 | Samar | 715/711 |

(Continued)

FOREIGN PATENT DOCUMENTS

EP 1083485 3/2001

(Continued)

OTHER PUBLICATIONS

IBM Technical Disclosure Bulletin, "Translucent Windows: Dragging an Image without Obscuring the Desktop:", vol. 37, No. 10, Oct. 1994, p. 15.

(Continued)

*Primary Examiner*—Matthew C. Bella
*Assistant Examiner*—G. F. Cunningham
(74) *Attorney, Agent, or Firm*—Marilyn Smith Dawkins; Amy J. Pattillo

(57) ABSTRACT

A method, system and program for displaying transparent resource aids are provided. A user interface is displayed comprising at least one displayable object within a display area controlled by a computer system. Responsive to an initiating event, a transparent resource aid is placed within the display area in association with the initiating event, such that the at least one displayable object is not obscured by the transparent resource aid. The transparency resource aid may indicate resource usage of hardware, software, and graphical characteristics.

25 Claims, 6 Drawing Sheets

U.S. PATENT DOCUMENTS 6,842,183 B1 * 1/2005 Higashiyama et al. ...... 345/592
2002/0196366 A1 * 12/2002 Cahill ........................ 348/537

FOREIGN PATENT DOCUMENTS

JP          5134830 A      12/1992
WO        WO 00/14574       3/2000

OTHER PUBLICATIONS

IBM Research Disclosure 431180, "Progressively animated graphical overlays", Mar. 2000, p. 592.

IBM Technical Disclosure Bulletin, "Balloon Windows for Supplementary Dialogues and Information", vol. 33, No. 10A, Mar. 1991, pp. 263-265.

Make the Language Bar Transparent, 1 page,—wysiwyg://fraContent.fraRightFrame.50/ht olbar_change_transparency.asp?frame=true.

TUCOWS Shell Enhancements Trans-XP, 2 pages, wysiwyg://20/http://www.tucows.com/system/preview/232626.html.

The Iconfactory: Your Quality Freeware Icons Hub (ibxp_home.asp), 2 pages, http://www.iconfactory.com/ibxp_home.asp.

Tweak_XP, 2 pages, http://www.totalidea.ce/transxp.htm.

Trans-XP Information, Details, and Download from VoodooFiles.com, 1 page, wysiwyg://15/http://www.voodoofiles.com/5817.

Cronosoft, 1 page, wysiwyg://26/http://www.cronosoft.com/download/qhwxp/index.htm.

* cited by examiner

DISPLAYING TRANSPARENT RESOURCE AIDS

CROSS-REFERENCE TO RELATED APPLICATIONS

The present application is related to the following co-pending applications, which are filed on even date herewith and incorporated herein by reference:

(1) U.S. patent application Ser. No. 10/059,093; and
(2) U.S. patent application Ser. No. 10/059,092;
(3) U.S. patent application Ser. No. 10/059,088;
(4) U.S. patent application Ser. No. 10/059,027;
(5) U.S. patent application Ser. No. 10/058,532;
(6) U.S. patent application Ser. No. 10/059,086;
(7) U.S. patent application Ser. No. 10/058,397;
(8) U.S. patent application Ser. No. 10/058,772;
(9) U.S. patent application Ser. No. 10/058,300;
(10) U.S. patent application Ser. No. 10/058,493; and
(11) U.S. patent application Ser. No. 10/058,599.

BACKGROUND OF THE INVENTION

1. Technical Field

The present invention relates in general to computer systems and, in particular, to graphical user interfaces. Still more particularly, the present invention relates to displaying resource aids transparently such that objects in a display area are not obscured from view by resource aids.

2. Description of the Related Art

Many operating systems include software for monitoring computer resources utilized by the operating system and other software applications executing in a computer system. Resources are any part of a computer system or a network, such as a disk drive, printer, or memory, that can be allotted to a program or a process while it is running. Such resource usage may be distinguished by categories such as user resources, system resources and graphical device interface resources. Text, charts or graphs may depict the resource usage. In addition, an icon including a graph for representing the device resources may depict the resource usage.

Most operating systems also provide a graphical user interface (GUI) for controlling a visual computer environment. The GUI represents programs, files, and options with graphical images, such as icons, menus, and dialog boxes on the screen. Graphical items defined within the GUI work the same way for the user in most software because the GUI provides standard software routines to handle these elements and report the user's actions.

A typical graphical element defined by a GUI is a window or other defined area of a display containing distinguishable text, graphics, video, audio and other information for output. A display area may contain multiple windows associated with a single software program or multiple software programs executing concurrently.

A GUI may offer the option of adding help aids for display within the GUI. Help aids often come in the form of a bubble or other distinguishable graphical area containing information to aid a user in performing a task or understanding the function of an icon, window or other object. Typically, help aids are positioned close to the icon, window, or other object for which help is provided.

Current resource monitoring software is different than help aids because dynamic data is monitored by current resource monitoring software. Current resource monitoring software is similar to help aids, and further limited, in that a user is required to initiate the monitoring application to receive resource information. Further, resource monitoring software is limited in that any display of monitored resources typically obscures the display area.

As the number of applications executing concurrently on a computer system increases and network capabilities continue to increase in importance, current resource monitoring systems are further limited in that resource information is not made available to users in a timely fashion. In addition, resource monitoring systems do not specify resource information across each application or specify the accessibility of a network link.

In view of the foregoing, it would be advantageous to provide a method, system, and program for dynamically displaying transparent resource aids in a display area, such that the transparent resource aids do not obscure the view of other graphics displayed. In addition, it would be advantageous to provide a method, system, and program for dynamically displaying the transparent resource aids in response to the position of a cursor or in response to a particular user defined event.

SUMMARY OF THE INVENTION

In view of the foregoing, it is therefore an object of the present invention to provide an improved computer system.

It is another object of the present invention to provide an improved graphical user interface.

It is yet another object of the present invention to provide a method, system and program for displaying resource aids transparently such that objects in a display area are not obscured from view by resource aids.

According to one aspect of the present invention, a user interface is displayed comprising at least one displayable object within a display area controlled by a computer system. Responsive to an initiating event, a transparent resource aid is placed within the display area in association with the initiating event, such that the at least one displayable object is not obscured by the transparent resource aid. The initiating event may include positioning a cursor over a sensitive region of a displayable object, a key entry, or a resource reaching a predefined limit.

According to another aspect, a visual indication of a dimensional height of the transparent resource aid may be adjusted to indicate a quantity associated with a monitored resource being described by the transparent resource aid.

Further, the performance of parts of a computer system may be monitored, wherein information for display in a transparent resource aid is compiled from the performance of parts of the computer system. Also, a transparency setting of each displayable object displayed within the graphical user interface may be monitored, wherein information for display in a transparent resource aid is compiled from the monitored transparency settings.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
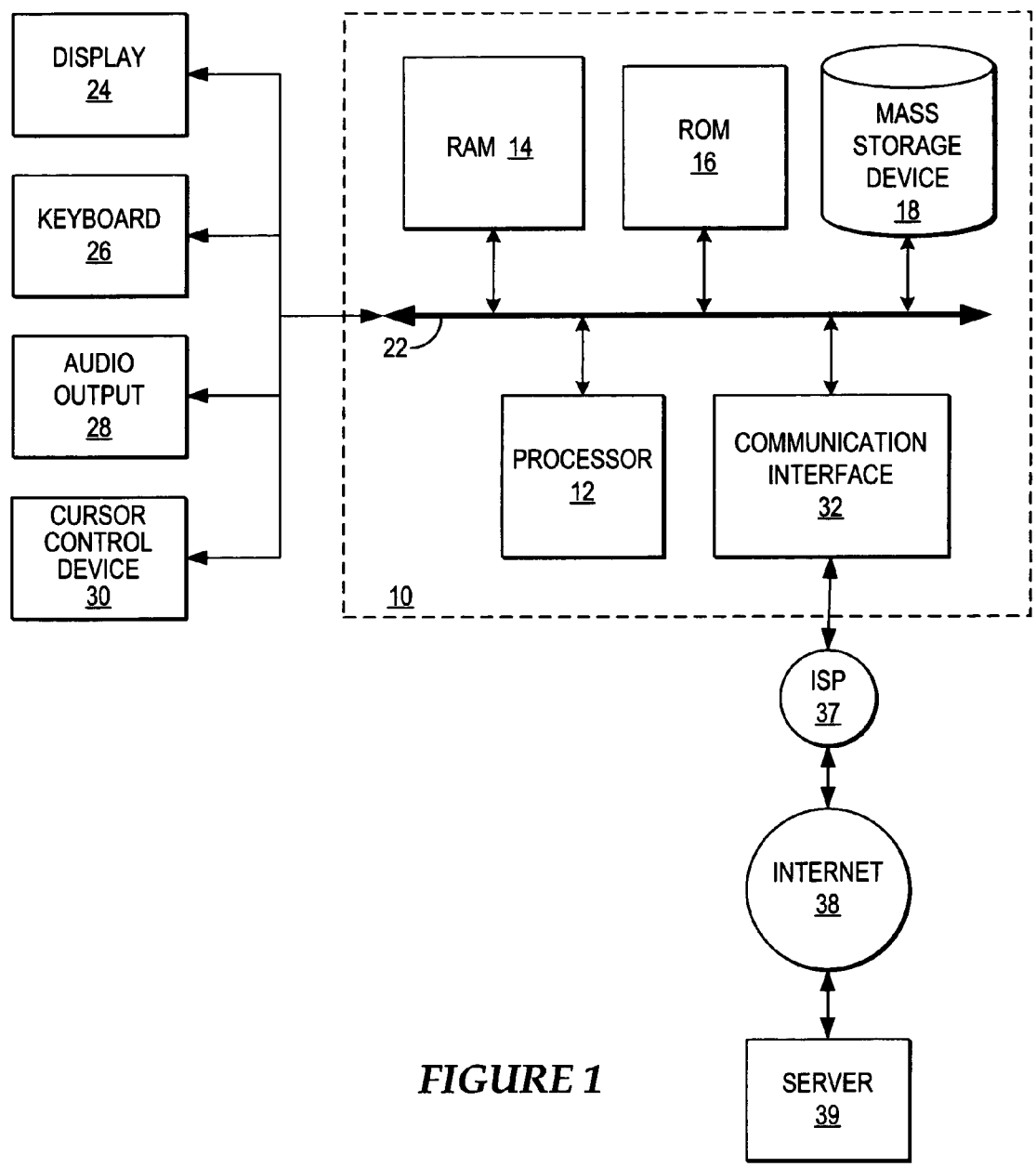
FIG. 1 depicts one embodiment of a computer system with which the method, system and program of the present invention may advantageously be utilized.

A method, system, and program for transparently displaying monitored resource status in response to an initiating event are provided. A transparent display of monitored resources in the form of a resource aid may include text, graphics, video, and other displayable objects displayed such that other displayed objects are not obscured. Further, audible outputs may enhance monitored resource output. Advantageously, the transparency of displayed monitored resources information may be adjusted by the user or automatically adjusted in response to other objects within the display area and the resource being depicted.

Monitored resources may include the functioning of any part of a computer system or a network. In particular, such parts of a computer system or network may include, but are not limited to, a disk drive, a printer, a scanner, a graphics card, a sound car, memory, processors, network accessibility, threads, central processing units (CPUs) and other devices included with a computer system or network. Further, use of software resources may be monitored. As will be understood by one skilled in the art, resources may be monitored by software executing on a computer system, by hardware, or by an alternate computer system.

Moreover, monitored resources may include monitoring the graphical resources utilized by windows and other graphical items depicted within the GUI. In particular, the current transparency of windows and the criteria utilized to set the current transparency of windows may be a monitored resource.

Additionally, resource aids may incorporate help aids providing both static and dynamic text. For example, a help aid may be depicted in response to an initiating event in correlation with monitored resource information or independent of any monitored resource information. In addition, help aid contents may adjust according to the status of a particular monitored resource such that help instructions are tailored according to utilization.

For purposes of the present invention, an initiating event may include, but is not limited to, a user directing a cursor over a resource sensitive region or a user defined event occurring. Preferably, each icon, graphic, window and other displayable object has a resource sensitive region where if a cursor passes over the region, resources monitored in association with the displayable object are transparently displayed. In addition, a displayable object may have a resource sensitive region wherein a user is required to input a key entry, voice entry or other input to initiate the transparent display. A user defined event may include a particular input from the user or a resource that has reached a maximum or minimum defined by the user.

Displayable objects may incorporate a range of graphical representations including, but not limited to, graphics, text, video and other output. Displayable objects may be represented by a window, an icon, a display area, and other regions with or without definable boundaries.

In a typical graphical display, there is both a background and foreground. In the present invention, displayable objects displayed in the background and foreground may be adjusted in transparency. In addition, resource aids may be incorporated in both background and foreground. Where a transparent resource aid is displayed in the foreground, the associated displayable object is preferably visible through the transparent resource aid. Where a transparent resource aid is displayed in the background, the transparent resource aid may adjust the tinting of the background behind an associated displayable object to highlight the associated displayable object.

To depict resource aids, multiple output formats may be utilized, where advantageously each output format utilizes transparency such that other displayed objects are not completely obscured. Output formats may include, but are not limited to, textual output, graphical output, video output, and audible output. More particularly, a resource aid graphical output may include a textual bubble adjusted in three-dimensions to further depict resource utilization. In addition, in particular, resource utilization may be output in multiple units of measure. For example, resource utilization for a CPU may be output as a percentage of total available power, as a rate of actual use, or as transparency percentage, where the transparency percentage correlates with a resource utilization measurement for the CPU.

Transparency is a graphical feature that is particularly advantageous to the present invention when displaying resource utilization as a resource aid that preferably overlaps other graphical elements to conserve screen space. As will be understood by one skilled in the art, by making a resource aid appear transparent on a computer screen, other elements below the resource aid are visible through the resource aid. Further, the transparency of a resource aid may be adjusted from opaque to totally transparent. In should be mentioned that while a resource aid will typically only utilize a portion of a display area, the resource aid may be expanded to the size of the display area.

Typically, the transparency attribute is stored with color values in an alpha channel. Then, when calculating the appearance of a given pixel, the graphic processor uses the alpha channel values to determine the pixel's color through a process termed alpha blending. Through alpha blending, the process adds a fraction of the color of the transparent object set by the alpha channel value to the color of the displayable object below. Mixing the colors together gives the appearance that the displayable object below is seen through a layer of the transparent resource aid. In addition to alpha blending, additional shading may be added to create shadows and other graphical images to cue the viewer to the position of the transparent resource aid.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardware Overview

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIG. 6 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communication interface 32, which carry the digital or analog data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. Display 24 may include both non-transparent surfaces, such as monitors, and transparent surfaces, such as headset sunglasses or vehicle windshield displays.

A keyboard 26 and cursor control device 30, such as a mouse, trackball, or cursor direction keys, are coupled to bus 22 as interfaces for user inputs to computer system 10. Keyboard 26 and cursor control device 30 can control the position of a cursor positioned within a display area of display 24. It should be understood that keyboard 26 and cursor control device 30 are examples of multiple types of input devices that may be utilized in the present invention. In alternate embodiments of the present invention, additional input and output peripheral components may be added.

Transparent Resource Aids Context

Figure 2:
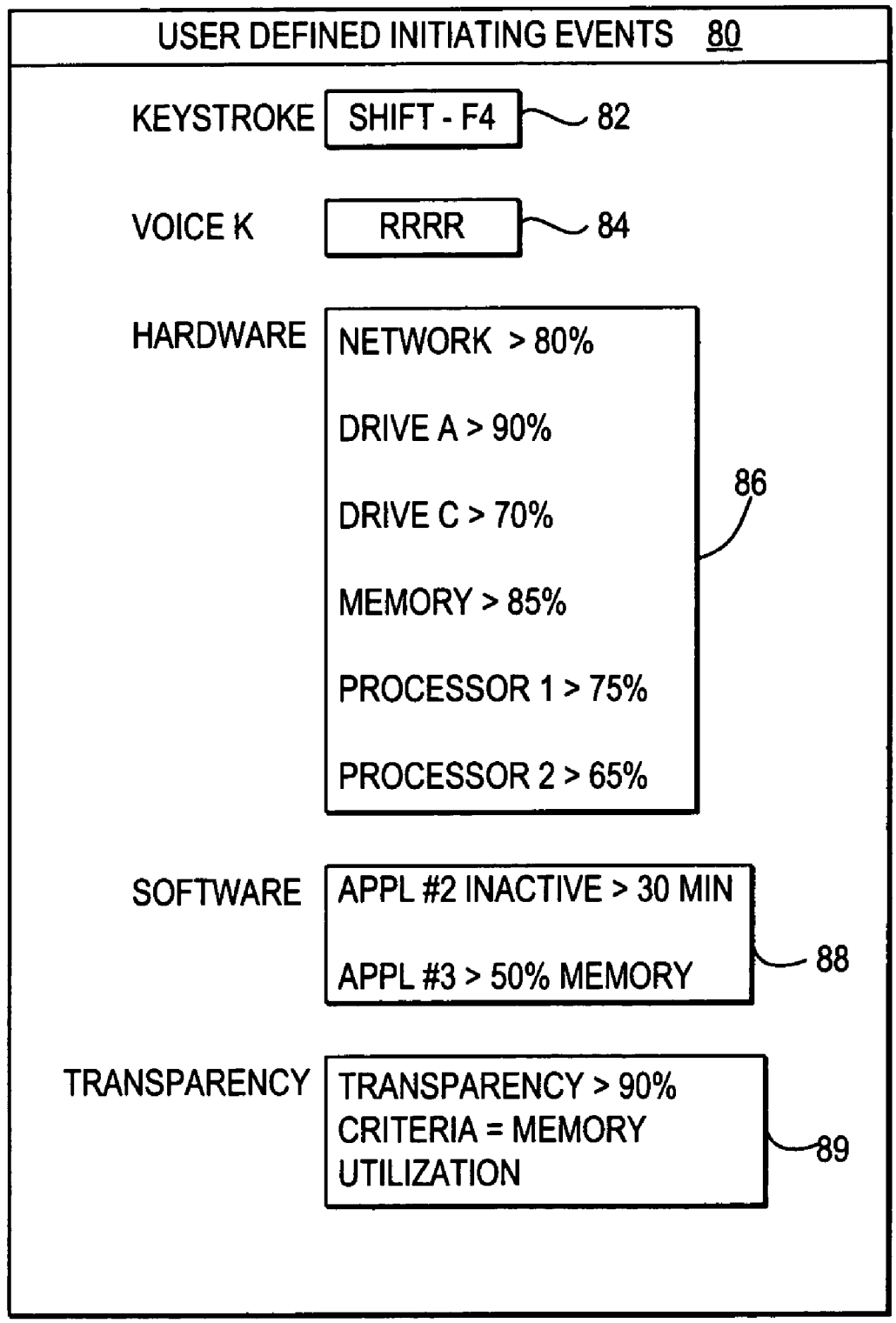
FIG. 2 illustrates a graphical representation of a window in which a user has defined initiating events in accordance with the method, system, and program of the present invention.

With reference now to FIG. 2, there is illustrated a graphical representation of a window in which a user has defined initiating events in accordance with the method, system, and program of the present invention. As depicted, a window 80 within a display area contains a keystroke selection 82, a voice command (K) selection 84, hardware selections 86, software selections 88, and transparency selections 89.

Keystroke selection 82 is advantageously at least one keystroke that when entered, initiates display of resources associated with the object that a cursor is placed over when the keystroke is detected. By defining keystroke selection 82, a user may control resource aids for windows, icons and other displayable objects that do not include a sensitive region. Alternatively, by indicating keystroke selection 82, a user may specify that display of resource aids requires a keystroke in addition to the position of the cursor.

Voice command selection 84 is advantageously at least one voice command that when entered, initiates display of resources associated with the object a cursor is placed over when the voice command is detected. In particular, voice commands may also be utilized to place the cursor in a particular position.

Hardware selections 86, in the present example, contain maximum resource aid settings for multiple hardware components. When a resource level rises above a maximum setting, display of a resource aid for that hardware component is initiated. In addition, minimum settings, ranges and other criteria may be utilized. Further settings are not limited to a percentage of the resource and may include time increments and other units of measure.

In the present example, when network capacity is greater than 80%, then display of a resource aid is initiated. If an icon, window or other displayable object associated with the network is within the display area, then the transparent resource aid is displayed in association with that displayable object. In addition, the transparent resource aid may also be displayed independent of an associated displayable object.

Software selections 88 advantageously specify resource aid settings for multiple software applications. In the present example, when a resource level rises above a maximum setting, display of a resource aid for that software component is initiated. Software selections 86 may include minimum settings, ranges, and other criteria.

Transparency selections 89 advantageously specify resource aid settings for windows and other displayable objects. In the present example, when the transparency of a window rises above 90% transparency, then display of a resource aid for depicting the transparency of that window is initiated. In addition, when memory utilization is utilized as the criteria for adjusting window transparency, then display of a resource aid for depicting the criteria utilized to determine transparency is initiated.

Figure 3:
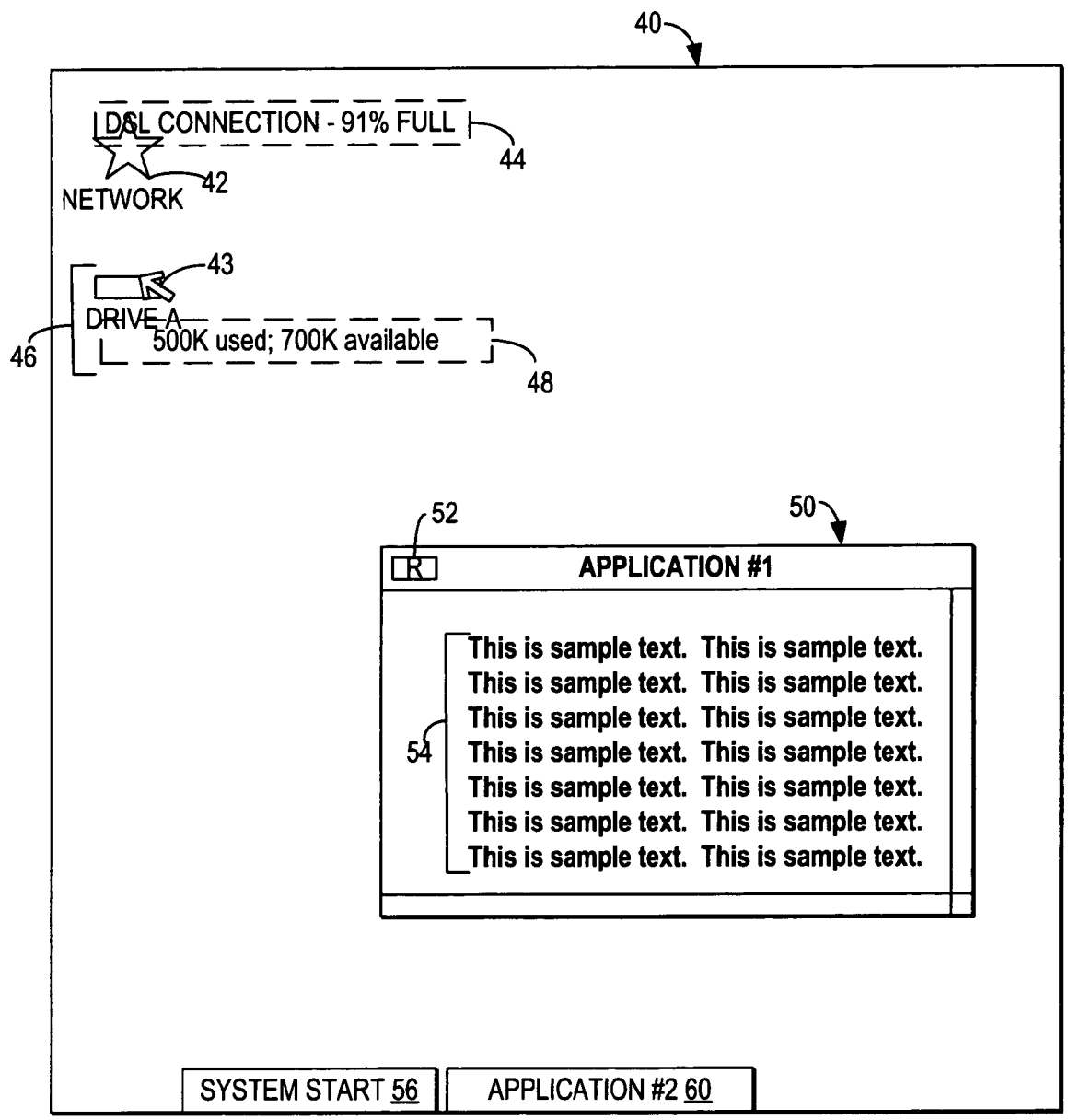
FIG. 3 depicts a graphical representation of a display area in which a cursor placement initiates a resource aid and a user defined level initiates another resource aid in accordance with the method, system, and program of the present invention.

Referring now to FIG. 3, there is depicted a graphical representation of a display area in which a cursor placement initiates a first resource aid and a user defined level initiates another resource aid in accordance with the method, system, and program of the present invention. As illustrated, a display area 40 within a display contains a network icon 42. A transparent resource aid 44 is displayed in association with network icon 42. In particular, the dotted line enclosing transparent resource aid 44 and other transparent resource aids indicate the text and/or the area surrounding the text are transparent such that the view of network icon 42 and other displayable objects are rendered visible through transparent resource aid 44.

In the present example, transparent resource aid 44 is preferably initiated in response to greater than 90% utilization of the DSL connection. In particular, the DSL server may transmit a signal allowing computer systems to monitor the capacity of the connection. Alternatively, hardware and software may enable the computer system to monitor usage of a network connection.

Display area 40 also contains a "drive A" icon 46. A transparent resource aid 48 is displayed in association with "drive A" icon 46. In the present example, transparent resource aid 48 is initiated in response to the position of cursor 43 in association with "drive A" icon 46. Advantageously, in the example, when cursor 43 is placed within the display area of "drive A" icon 46, display of a resource aid is initiated. Alternatively, initiation of display of a resource aid may require cursor 43 to be placed within the display area of "drive A" icon 46 and a key or voice command entry.

Further, display area 40 contains a window 50 for "application #1". In particular, sample text is depicted within window 50. In addition, a sensitive region 52 is illustrated within the title bar of window 50. Display area 40 also contains a system start selectable tab 56 and an "application #2" selectable tab 60. Resource aids in association with window 50, system start selectable tab 56 and "application #2" selectable tab 60 will be further described.

Figure 4:
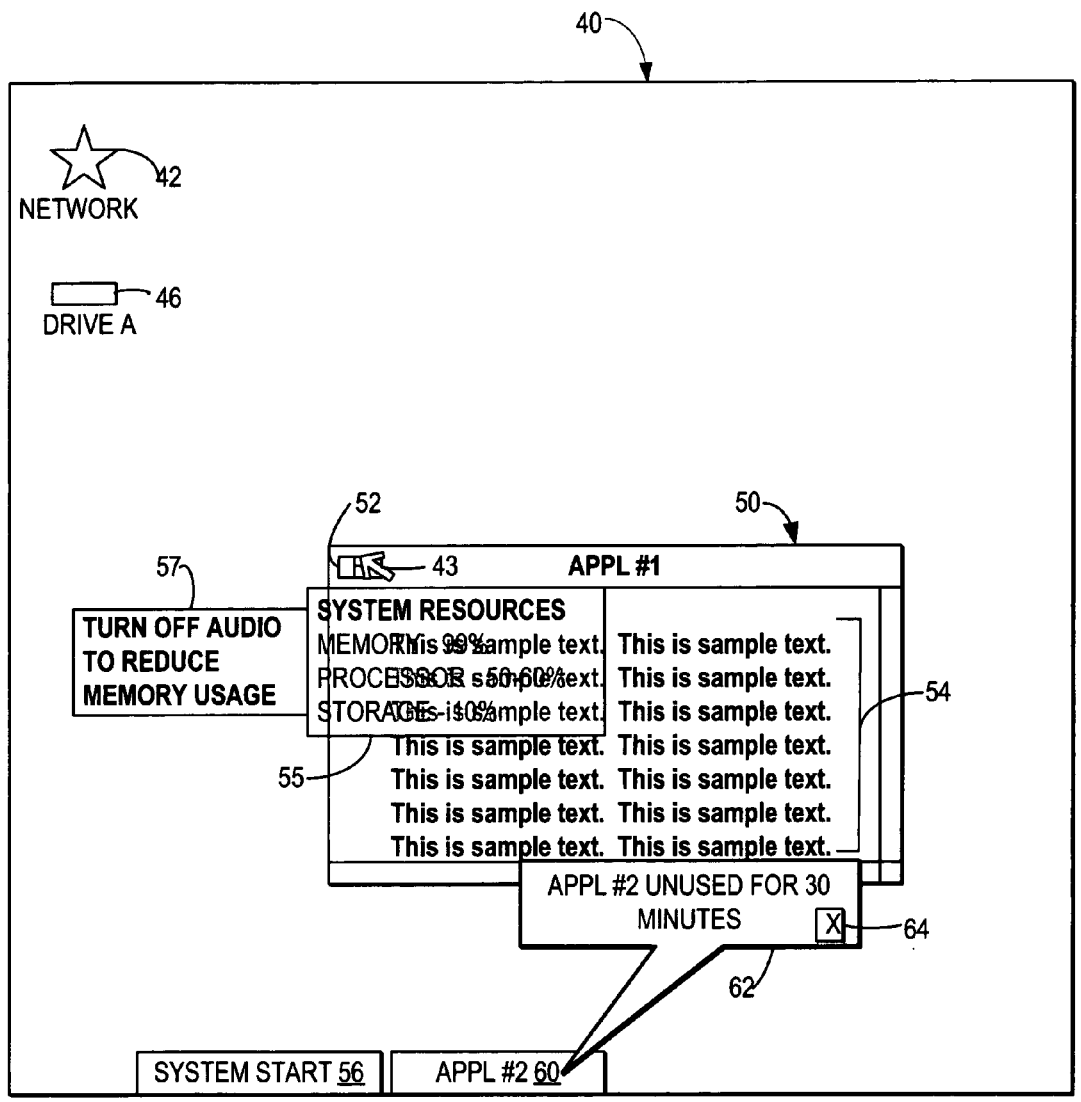
FIG. 4 illustrates a graphical representation of a display area in which a cursor placement over a sensitive region initiates a resource aid, in accordance with the method, system, and program of the present invention.

With reference now to FIG. 4, there is illustrated a graphical representation of a display area in which a cursor placement over a sensitive region initiates a resource aid, in accordance with the method, system, and program of the present invention. As illustrated, cursor 43 is placed over sensitive region 52. In response to the position of cursor 43, transparent resource aid 55 is displayed. In particular, in the present example, the transparency of transparent resource aid 55 is adjusted such that the portion of sample text 54 displayed thereunder is displayed at a reduced opaqueness. In addition, in particular, sensitive region 52 is only a limited graphical portion of window 50 such that transparent resource aid 55 will only be displayed when cursor 43 is positioned over that portion of window 50.

According to one advantage of the present invention, help aids may be incorporated with resource aids, where the help aids are specified in response to current resource utilization. In the example, transparent resource aid 57 is displayed overlapping sample text 54.

In addition, display area 40 contains a transparent resource bubble 62 in association with "application #2" selectable tab 60. As depicted in FIG. 2, a user has defined an initiating event when "application #2" has been inactive for more than thirty minutes. In the present example, transparent resource bubble 62 is therefore initiated in response to "application #2" remaining inactive for more than thirty minutes. Advantageously, transparent resource bubble 62 is adjusted in transparency such that window 50 is visible therethrough.

In addition, advantageously, transparent resource bubble 62 is adjusted three-dimensionally to reflect the number of minutes "application #2" has remained inactive. As the number of minutes increases, the height of transparent resource bubble 62 advantageously adjusts to reflect the increase. In alternate embodiments, a third dimension may advantageously be added to alternate resource aids where the visual dimension of the resource aid adjusts to reflect resource utilization.

Preferably, a user may select to close, minimize, or enlarge a transparent resource indicator, such as transparent resource bubble 62, by moving cursor 43 over the graphical area and clicking or entering other input indicating the transparent resource indicator is to be adjusted. In the present example, if a user selects selectable icon 64 with cursor 43, then transparent resource bubble 62 will close.

Figure 5:
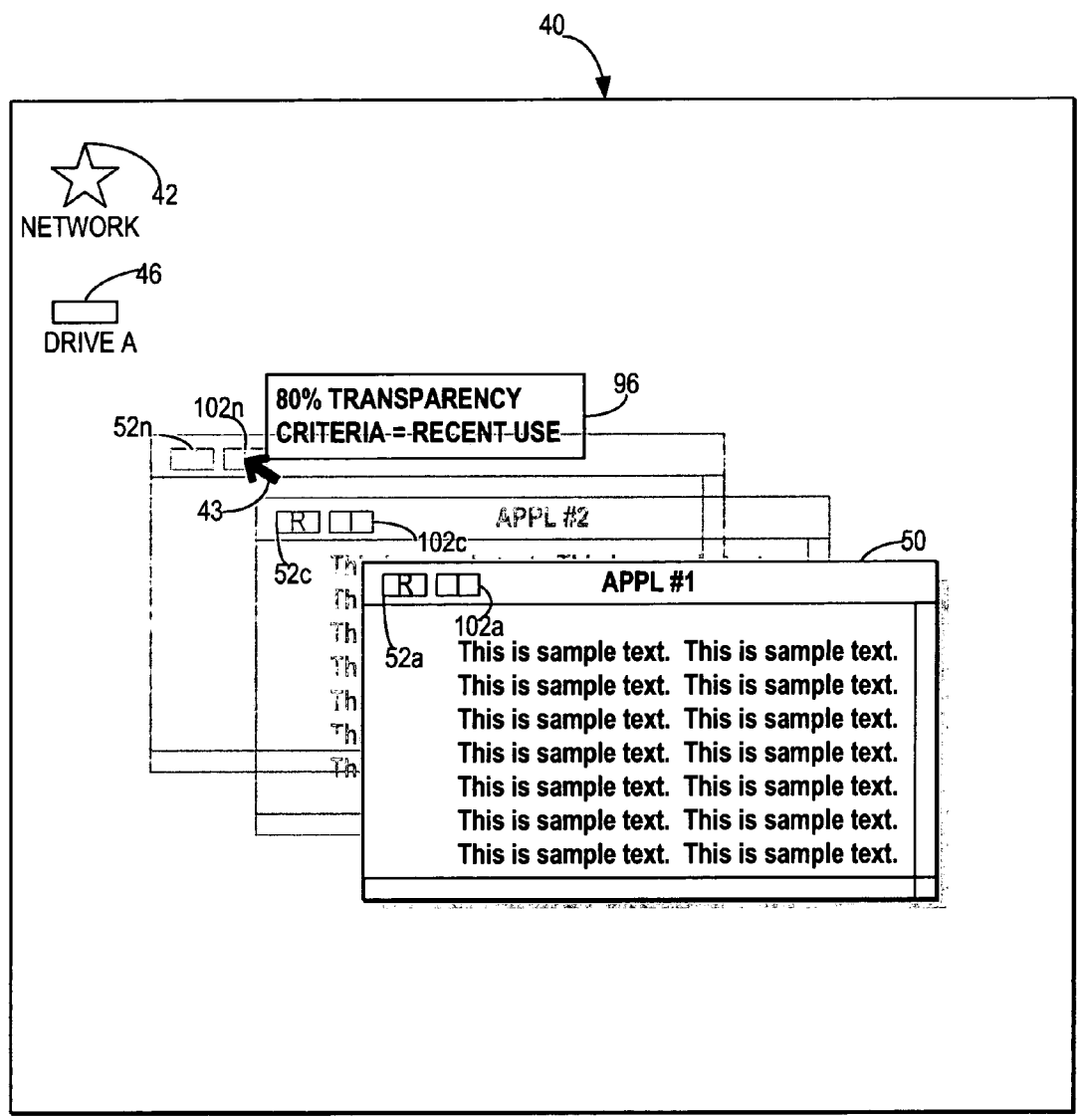
FIG. 5 depicts a graphical representation of a display area in which a cursor placement over a sensitive region initiates a transparency resource aid, in accordance with the method, system, and program of the present invention.

With reference now to FIG. 5, there is illustrated a graphical representation of a display area in which a cursor placement over a sensitive region initiates a transparency resource aid, in accordance with the method, system, and program of the present invention. As depicted, display area 40 includes multiple windows 50, 90, and 92. A level of transparency is applied to each of the windows, such that window 50 is displayed at 0% transparency, window 90 is displayed at 50% transparency, and window 92 is displayed at 70% transparency, where 0% transparency is opaque and 100% transparency is completely transparent.

Preferably, windows may be adjusted in transparency in response to resource utilization or other criteria. In the example depicted, the transparency criteria sets the most recently used window to the least transparency.

According to one advantage of the present invention, a user may initiate a transparency resource aid that specifically details the transparency of each window and the resource utilization and other criteria utilized to set the current transparency levels of each window. In the example, transparency sensitive regions 102a–102n are each positioned within the title bar of windows 50, 90, and 92. In response to a user positioning cursor 43 over transparency sensitive region 102n, a transparency resource aid 96 is displayed.

Transparency resource aid 96 details the current transparency of window 92 at 80% transparency, where the transparency is set according to recent use. In alternate embodiments of the present invention, other types of transparency related information may be specified in transparency resource aid 96. In addition, where multiple criteria are utilized to set the current transparency of a window, those multiple criteria may be detailed according to the percentage of transparency contributed to each of the multiple criteria.

While transparency resource aid 96 is specifically displayed in response to the positioning of cursor 43 over transparency sensitive region 102n, in alternate embodiments, other events may initiate the display of resource aid 96. For example, when a window reaches a particular transparency threshold, a transparency resource aid may automatically be displayed. As another example, when a new transparency criteria is implemented for adjusting the criteria of multiple windows, a transparency resource aid may be displayed to alert the user to the current criteria for adjusting window transparency. Moreover, transparency resource aid information may be incorporated within other resource aids, such as transparent resource aid 55 or transparent resource bubble 62 depicted in FIG. 4.

Figure 6:
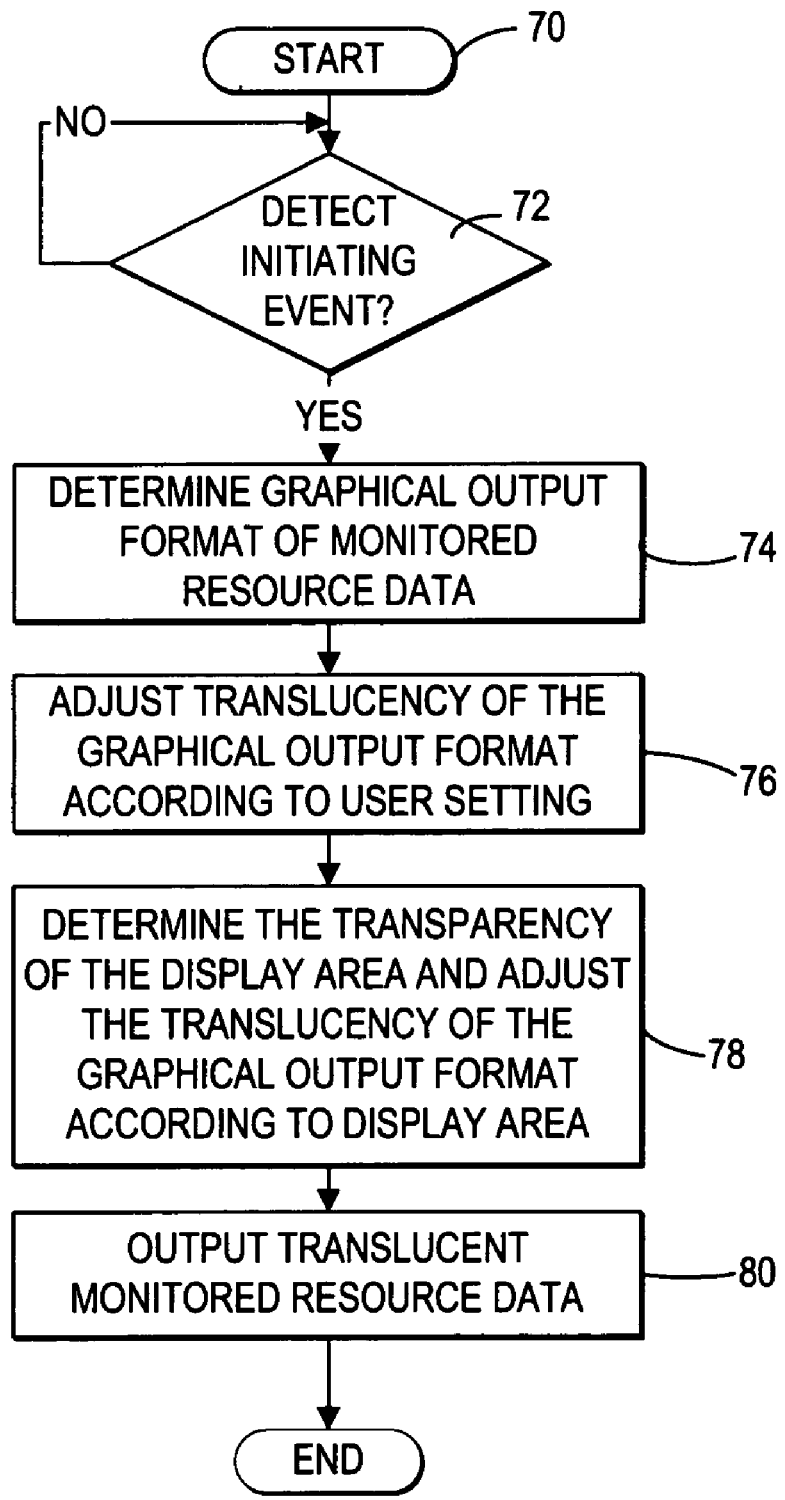
FIG. 6 illustrates a high level logic flowchart of a process and program for outputting transparent resource data in accordance with the method, system, and program of the present invention.

Referring now to FIG. 6, there is depicted a high level logic flowchart of a process and program for outputting transparent resource data in accordance with the method, system, and program of the present invention. As depicted, the process starts at block 70 and thereafter proceeds to block 72. Block 72 illustrates a determination as to whether or not an initiating event is detected. If an initiating event is not detected, then the process iterates at block 72. If an initiating event is detected, then the process passes to block 74.

Block 74 depicts determining the graphical output format of monitored resource data associated with the initiating event. Next, block 76 illustrates adjusting the transparency of the graphical output format according to the user transparency preference settings. Thereafter, block 78 depicts determining the transparency of the display area for the resource aid data output and further adjusting the transparency according to other objects in the display area. In particular, in determining the display area for resource aid data output, a position is chosen to maximize available screen space. Further, block 80 illustrates outputting the transparent monitored resource data in the display area, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for displaying resource aids in a display area, said method comprising the steps of:

monitoring a separate status of each of a plurality of computer resources comprising at least one processing resource, at least one storage resource, at least one memory resource, at least one software resource, and at least one graphical resource;

displaying a user interface comprising at least one displayable object within a display area with a plurality of separate cursor position sensitive regions each graphically distinguished within a total display region of said displayable object solely for triggering a transparent resource aid upon detection of a cursor, wherein each of said plurality of cursor position sensitive regions is associated with a separate selection of monitored resources from among said plurality of monitored computer resources;

comparing said separate status of each of said plurality of computer resources with at least one user specified threshold for each of said plurality of computer resources; and responsive to detecting at least one from among said separate status for at least one of said separate selection of monitored resources associated with a particular cursor position sensitive region exceeding said threshold and said cursor positioned over said particular cursor position sensitive region from among said plurality of cursor position sensitive regions of said displayable object, placing a transparent resource aid within said display area in association with said displayable object, wherein said transparent resource aid presents said separate status of said separate selection of monitored resources associated with said particular cursor position sensitive region, such that said at least one displayable object is not obscured by said transparent resource aid.

2. The method for displaying resource aids in accordance with claim 1, said method further comprising the step of:

responsive to detecting a user input of one of a keystroke or a voice command and detecting said cursor position over said particular cursor position sensitive region from among said plurality of cursor position sensitive regions of said displayable object, placing said transparent resource aid within said display area in association with said displayable object.

3. The method for displaying resource aids in accordance with claim 1, said method further comprising the steps of:

determining a graphical output format for said transparent resource aid;

adjusting a transparency of said transparent resource aid according to user transparency preferences;

determining a display position for said transparent resource aid; and adjusting said transparency of said transparent resource aid according to said display position.

4. The method for displaying resource aids in accordance with claim 1, said method further comprising the steps of:

monitoring said separate status of said at least one graphical resource from transparency setting for said displayable object displayed within said user interface and a criteria used to specify said transparency setting.

5. The method for displaying resource aids in accordance with claim 1, said method further comprising the step of:

placing said transparent resource aid to maximize space remaining in said display area.

6. The method for displaying resource aids in accordance with claim 1, said method further comprising the step of:

placing said transparent resource aid, wherein said transparent resource aid comprises at least one from among text, graphics, video, and audio.

7. The method for displaying resource aids in accordance with claim 1, said method further comprising the step of:

adjusting a visual indication of a dimensional height of said transparent resource aid to indicate a quantity associated with said separate status of said separate selection of monitored resources being described by said transparent resource aid.

8. The method for displaying resource aids in accordance with claim 1, said method further comprising the step of:

placing said transparent resource aid in a background of said display area in association with said at least one displayable object, wherein said transparent resource aid is darkened to draw attention to said at least one displayable object.

9. A system for displaying resource aids in a display area, said system comprising:

a graphical user interface;

means for monitoring a separate status of each of a plurality of computer resources comprising at least one processing resource, at least one storage resource, at least one memory resource, at least one software resource, and at least one graphical resource;

means for displaying at least one displayable object within a display area of said graphical user interface with a plurality of separate cursor position sensitive regions each graphically distinguished within a total display region of said displayable object solely for triggering a transparent resource aid upon detection of a cursor, wherein each of said plurality of cursor position sensitive regions is associated with a separate selection of monitored resources from among said plurality of monitored computer resources;

means for comparing said separate status of each of said plurality of computer resources with at least one user specified threshold for each of said plurality of computer resources; and means responsive to detecting at least one from among said separate status for at least one of said separate selection of monitored resources associated with a particular cursor position sensitive region exceeding said threshold and said cursor positioned over said particular cursor position sensitive region from among said plurality of cursor position sensitive regions of said displayable object, for placing a transparent resource aid within said display area in association with said displayable object, wherein said transparent resource aid presents said separate status of said separate selection of monitored resources associated with said particular cursor position sensitive region.

10. The system for displaying resource aids in accordance with claim 9, further comprising:

responsive to detecting a user input of one of a keystroke or a voice command and detecting said cursor position over said particular cursor position sensitive region from among said plurality of cursor position sensitive regions of said displayable object, placing said transparent resource aid within said display area in association with said displayable object.

11. The system for displaying resource aids in accordance with claim 9, said system further comprising:

means for determining a graphical output format for said transparent resource aid;

means for adjusting a transparency of said transparent resource aid according to user transparency preferences;

means for determining a display position for said transparent resource aid; and means for adjusting said transparency of said transparent resource aid according to said display position.

12. The system for displaying resource aids in accordance with claim 9, said system further comprising:

means for monitoring said separate status of said at least one graphical resource from a transparency setting for said displayable object displayed within said user interface and a criteria used to specify said transparency setting.

13. The system for displaying resource aids in accordance with claim 9, said system further comprising:

means for placing said transparent resource aid to maximize space remaining in said display area.

14. The system for displaying resource aids in accordance with claim 9, said system further comprising:

means for placing said transparent resource aid, wherein said transparent resource aid comprises at least one from among text, graphics, video, and audio.

15. The system for displaying resource aids in accordance with claim 9, said system further comprising:

means for adjusting a visual indication of a dimensional height of said transparent resource aid to indicate a quantity associated with said separate status of said separate selection of monitored resources being described by said transparent resource aid.

16. The system for displaying resource aids in accordance with claim 9, said system further comprising:

means for placing said transparent resource aid in a background of said display area in association with said at least one displayable object, wherein said transparent resource aid is darkened to draw attention to said at least one displayable object.

17. A program for displaying resource aids in a display area, residing on a computer usable medium having computer readable program code means, said program comprising:

means for monitoring a separate status of each of a plurality of computer resources comprising at least one processing resource, at least one storage resource, at least one memory resource, at least one software resource, and at least one graphical resource;

means for displaying at least one displayable object within a display area of said graphical user interface with a plurality of separate cursor position sensitive regions each graphically distinguished within a total display region of said displayable object solely for triggering a transparent resource aid upon detection of a cursor, wherein each of said plurality of cursor position sensitive regions is associated with a separate selection of monitored resources from among said plurality of monitored computer resources;

means for comparing said separate status of each of said plurality of computer resources with at least one user specified threshold for each of said plurality of computer resources; and means for controlling placement of a transparent resource aid within said display area in association with said displayable object in response to detecting at least one from among said separate status for at least one of said separate selection of monitored resources associated with a particular cursor position sensitive region exceeding said threshold and said cursor positioned over said particular cursor position sensitive region from among said plurality of cursor position sensitive regions of said displayable object, wherein said transparent resource aid presents said separate status of said separate selection of monitored resources associated with said particular cursor position sensitive region.

18. The program for displaying resource aids in accordance with claim 17, said program further comprising:

means for determining a graphical output format for said transparent resource aid;

means for adjusting a transparency of said transparent resource aid according to user transparency preferences;

means for determining a display position for said transparent resource aid; and means for adjusting said transparency of said transparent resource aid according to said display position.

19. The program for displaying resource aids in accordance with claim 17, said program further comprising:

means for monitoring said separate status of said at least one graphical resource from a transparency setting for said displayable object displayed within said user interface and a criteria used to specify said transparency setting.

20. The program for displaying resource aids in accordance with claim 17, said program further comprising:

means for controlling placement of said transparent resource aid to maximize space remaining in said display area.

21. The program for displaying resource aids in accordance with claim 17, said program farther comprising:

means for adjusting a visual indication of a dimensional height of said transparent resource aid to indicate a quantity associated with said separate status of said separate selection of monitored resources being described by said transparent resource aid.

22. The program for displaying resource aids in accordance with claim 17, said program further comprising:

means for placing said transparent resource aid in a background of said display area in association with said at least one displayable object.

23. A method for displaying resource aids in a display area, said method comprising the steps of:

monitoring a separate status of each of a plurality of computer resources comprising at least one processing resource, at least one storage resource, at least one memory resource, at least one software resource, and at least one graphical resource;

displaying a user interface comprising at least one displayable object within a display area with a plurality of separate cursor position sensitive regions each graphically distinguished within a total display region of said displayable object solely for triggering a transparent resource aid upon detection of a cursor, wherein each of said plurality of cursor position sensitive regions is associated with a separate selection of monitored resources from among said plurality of monitored computer resources;

comparing said separate status of each of said plurality of computer resources with at least one user specified threshold for each of said plurality of computer resources;

responsive to detecting at least one from among said separate status for at least one of said separate selection of monitored resources associated with a particular cursor position sensitive region exceeding said threshold and said cursor positioned over said particular cursor position sensitive region from among said plurality of cursor position sensitive regions of said displayable object, placing a transparent resource aid within said display area in association with said displayable object, wherein said transparent resource aid presents said separate status of said separate selection of monitored resources associated with said particular cursor position sensitive region, such that said at least one displayable object is not obscured by said transparent resource aid; and adjusting a visual indication of a dimensional height of said transparent resource aid to indicate a quantity associated with said separate status of said separate selection of monitored resources being described by said transparent resource aid.

24. A system for displaying resource aids in a display area, said system comprising:

a graphical user interface;

means for monitoring a separate status of each of a plurality of computer resources comprising at least one processing resource, at least one storage resource, at least one memory resource, at least one software resource, and at least one graphical resource;

means for displaying at least one displayable object within a display area of said graphical user interface with a plurality of separate cursor position sensitive regions each graphically distinguished within a total display region of said displayable object solely for triggering a transparent resource aid upon detection of a cursor, wherein each of said plurality of cursor position sensitive regions is associated with a separate selection of monitored resources from among said plurality of monitored computer resources;

means for comparing said separate status of each of said plurality of computer resources with at least one user specified threshold for each of said plurality of computer resources;

means responsive to detecting at least one from among said separate status for at least one of said separate selection of monitored resources associated with a particular cursor position sensitive region exceeding said threshold and said cursor positioned over said particular cursor position sensitive region from among said plurality of cursor position sensitive regions of said displayable object, for placing a transparent resource aid within said display area in association with said displayable object, wherein said transparent resource aid presents said separate status of said separate selection of monitored resources associated with said particular cursor position sensitive region; and means for adjusting a visual indication of a dimensional height of said transparent resource aid to indicate a quantity associated with said separate status of said separate selection of monitored resources being described by said transparent resource aid.

25. A program for displaying resource aids in a display area, residing on a computer usable medium having computer readable program code means, said program comprising:

means for monitoring a separate status of each of a plurality of computer resources comprising at least one processing resource, at least one storage resource, at least one memory resource, at least one software resource, and at least one graphical resource;

means for displaying at least one displayable object within a display area of said graphical user interface with a plurality of separate cursor position sensitive regions each graphically distinguished within a total display region of said displayable object solely for triggering a transparent resource aid upon detection of a cursor, wherein each of said plurality of cursor position sensitive regions is associated with a separate selection of monitored resources from among said plurality of monitored computer resources;

means for comparing said separate status of each of said plurality of computer resources with at least one user specified threshold for each of said plurality of computer resources; and means for controlling placement of a transparent resource aid within said display area in association with said displayable object in response to detecting at least one from among said separate status for at least one of said separate selection of monitored resources associated with a particular cursor position sensitive region exceeding said threshold and said cursor positioned over said particular cursor position sensitive region from among said plurality of cursor position sensitive regions of said displayable object, wherein said transparent resource aid presents said separate status of said separate selection of monitored resources associated with said particular cursor position sensitive region means for controlling adjustment of a visual indication of a dimensional height of said transparent resource aid to indicate a quantity associated with said separate status of said separate selection of monitored resources being described by said transparent resource aid.

* * * * *

UNITED STATES PATENT AND TRADEMARK OFFICE
CERTIFICATE OF CORRECTION

| | | |
|---|---|---|
| PATENT NO. | : 7,046,254 B2 | Page 1 of 1 |
| APPLICATION NO. | : 10/059011 | |
| DATED | : May 16, 2006 | |
| INVENTOR(S) | : Michael Wayne Brown et al. | |

It is certified that error appears in the above-identified patent and that said Letters Patent is hereby corrected as shown below:

At Claim 4, col. 11, line 8, insert --a-- after "from" and before "transparency".

Signed and Sealed this

Fifth Day of December, 2006

JON W. DUDAS
*Director of the United States Patent and Trademark Office*